United States Patent
Machcha et al.

(10) Patent No.: US 7,827,328 B2
(45) Date of Patent: Nov. 2, 2010

(54) METHOD AND APPARATUS FOR A DISK STORAGE DEVICE INCLUDING FILE SYSTEM AND AT LEAST ONE NETWORK INTERFACE

(75) Inventors: Ashok R. Machcha, Santa Clara, CA (US); Debasis Baral, San Jose, CA (US)

(73) Assignee: Samsung Electronics Co., Ltd, Suwon, Kyungki-Do (KR)

( * ) Notice: Subject to any disclaimer, the term of this patent is extended or adjusted under 35 U.S.C. 154(b) by 272 days.

(21) Appl. No.: 12/173,512

(22) Filed: Jul. 15, 2008

(65) Prior Publication Data

US 2010/0014181 A1   Jan. 21, 2010

(51) Int. Cl.
    G06F 13/12    (2006.01)
    G06F 3/00     (2006.01)
(52) U.S. Cl. .......................... 710/62; 710/36; 711/100
(58) Field of Classification Search ............. 710/62–74, 710/36; 709/250; 711/100
    See application file for complete search history.

(56) References Cited

U.S. PATENT DOCUMENTS

| | | | |
|---|---|---|---|
| 6,687,829 B1 * | 2/2004 | Miyamoto et al. ............. 726/7 |
| 6,954,852 B2 * | 10/2005 | Burokas et al. ................ 713/2 |
| 7,127,718 B1 * | 10/2006 | Gavlik et al. ................ 718/107 |
| 7,181,577 B2 * | 2/2007 | Shimada et al. ............. 711/153 |
| 2005/0091454 A1 * | 4/2005 | Shimada et al. ............. 711/114 |
| 2006/0080522 A1 * | 4/2006 | Button et al. .................. 713/2 |
| 2007/0106872 A1 * | 5/2007 | Shimada et al. ............. 711/173 |
| 2008/0294844 A1 * | 11/2008 | Yamasaki .................... 711/114 |

\* cited by examiner

Primary Examiner—Christopher B Shin
(74) Attorney, Agent, or Firm—GSS Law Group (57) ABSTRACT

A disk storage device is disclosed including at least one disk unit, a first processor to control the disk unit making possible access of its data and a second processor communicating with the first while operating a file system for disk access and at least one network interface. The network interface is operated to receive an access request. The file system is operated based upon the access request to organize access of the data to create an access response. The disk units are disclosed as a hard disk unit and/or a solid state data unit. The disk storage unit may further include at least one multi-media interface and/or at least one serial interface and/or a Bluetooth interface. An integrated circuit and an assembled circuit board are disclosed including both processors.

18 Claims, 6 Drawing Sheets

METHOD AND APPARATUS FOR A DISK STORAGE DEVICE INCLUDING FILE SYSTEM AND AT LEAST ONE NETWORK INTERFACE

TECHNICAL FIELD

This invention relates to disk storage devices including a file system and at least one network interface.

BACKGROUND OF THE INVENTION

Over the last several years, disk storage devices have been included in systems that used a separate computer interacting with a network interface and operating a file system to control access to the disk storage device. Some of these devices have been called network disk drives, but in fact, they have required a separate computer from their disk storage device to achieve their functionality. What is needed is a way to fundamentally simplify and cost reduce these systems.

SUMMARY OF THE INVENTION

An embodiment of the invention include a disk storage device including at least one disk unit configured to store data, a first processor to control the disk unit making possible access of its data and a second processor communicating with the first while operating a file system for disk access and a network interface. The disk units may include a hard disk unit and/or a solid state data unit. The network interface is operated to receive an access request. The file system is operated based upon the access request to organize access of the disk data to create an access response. This basic disk storage device removes the expense of a separate computer, a separate network interface and separately maintained file system. Embodiments of the invention may also include the assembled circuit board and an integrated circuit including the two processors.

Further preferred embodiments of the disk storage device may include more than one network interface, preferably at least one dedicated to wireline communications and at least one to wireless communications, facilitating the needs of many home and business environments for flexible interface capabilities.

Further preferred embodiments of the disk storage device may include at least one multi-media interface for delivering at least one multi-media stream. As used herein, a multi-media stream delivers at least one video stream and at least one audio stream. This added capability serves to provide multi-media streams directly from the disk storage device without the expense of additional devices and the complexity of making them all work together.

BRIEF DESCRIPTION OF THE DRAWINGS

FIG. 2 shows a schematic of the disk storage device of FIG. 1. The assembled circuit board may include a first processor controllably coupled to the voice coil motor and to the spindle motor and communicatively coupled to a slider that may be positioned over the rotating disk surface. The assembled circuit board may also include a second processor communicatively coupled to the first processor. The second processor is communicatively coupled to at least one network interface, and as shown, to two network interfaces, one of which supports a first physical transport to a wireless network and the other supporting a second physical transport to a wireline network. The second processor operates a file system to organize the access of the data in the hard disk unit. It also operates a network entity for processing at least one access request received from one of the network interfaces to use the file system for the access of the data to create at least one access response. The assembled circuit board may further include at least one multi-media interface delivering across a third physical transport a multi-media stream including at least one video stream and at least one audio stream. The assembled circuit board may also include a serial interface to a Universal Serial Bus (USB) device and/or to a firewire device. The assembled circuit board may include an integrated circuit containing the processors. It may also include a Bluetooth interface to at least one Bluetooth device.

DETAILED DESCRIPTION

This invention relates to disk storage devices including a file system and a network interface. Embodiments of the invention include the disk storage device including at least one disk unit, a first processor to control the internal components making possible access of data of the disk unit and a second processor communicating with the first, as well as operating a file system for disk access and a network interface. The network interface is operated to receive an access request. The file system is operated based upon the access request to organize access of the disk data to create an access response. This basic disk storage device removes the expense of a separate computer, a separate network interface and separately maintained file system. Embodiments of the invention may also include the assembled circuit board and an integrated circuit including the two processors.

Figure 1:
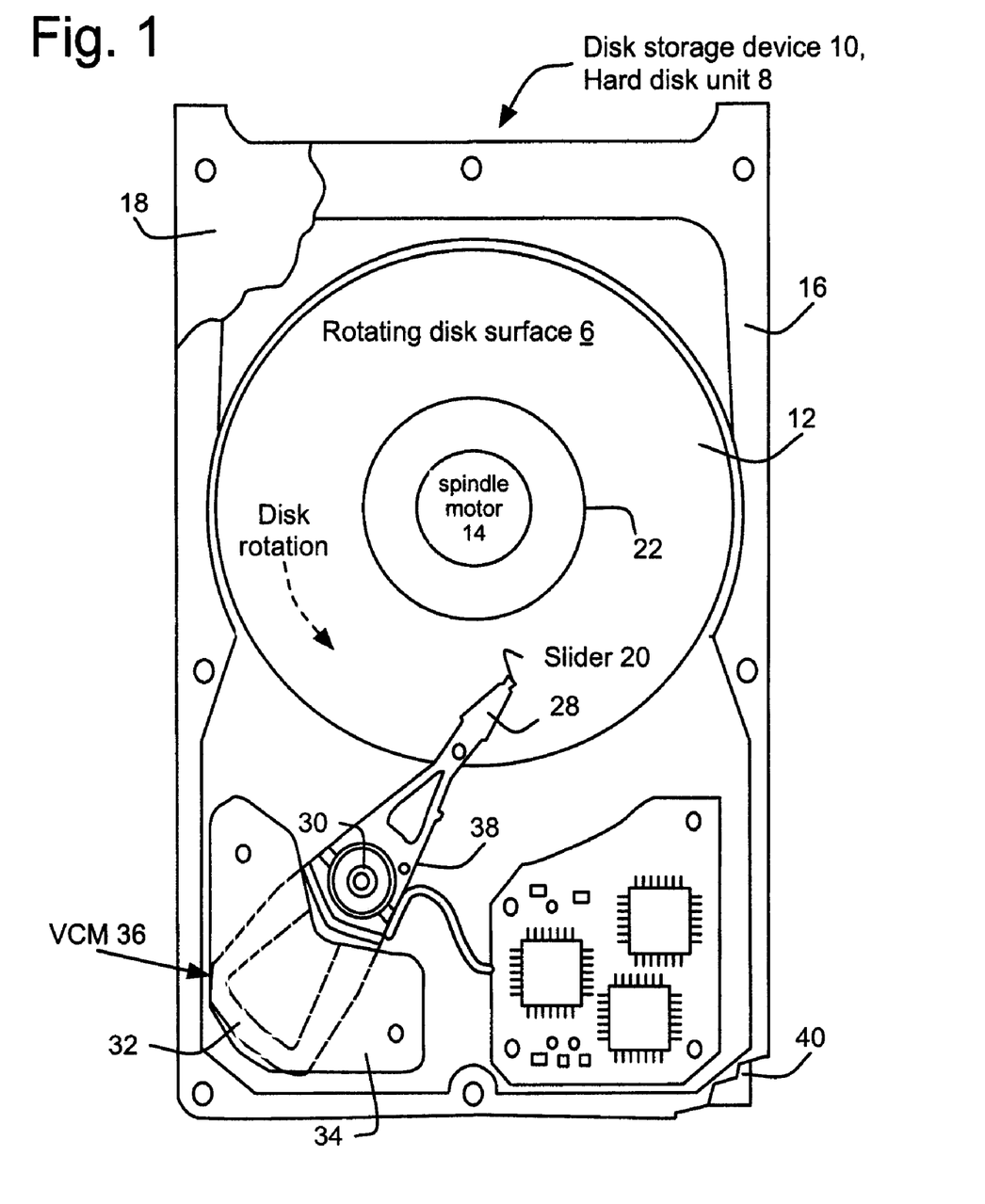
FIG. 1 shows an example of an embodiment of the invention as a disk storage device including a hard disk unit with a disk base to which a spindle motor is mounted with at least one disk rotatably coupled to the spindle motor to create a rotating disk surface. A voice coil motor includes a head stack assembly pivotably mounted by an actuator pivot to the disk base, responsive to its voice coil interacting with a fixed magnetic assembly mounted on the disk base and configured to position at least one slider to access data stored on the rotating disk surface. The disk storage device includes an assembled circuit board also mounted on the disk base opposite the spindle motor and the voice coil motor.

Referring to the drawings more particularly by reference numbers, FIG. 1 shows an example of an embodiment of the invention as a disk storage device 10 that may include at least one disk unit. In this example the disk unit is a hard disk unit 8. Alternatively, the disk unit may be a solid state data unit and/or the disk storage device may include more than one disk unit. The hard disk unit preferably includes a disk base 16 to which a spindle motor 14 is mounted with at least one disk 12 rotatably coupled to the spindle motor to create a rotating disk surface 6. A voice coil motor 36 includes a head stack assembly 38 pivotably mounted by its actuator pivot 30 to the disk base, responsive to its voice coil 32 interacting with a fixed magnetic assembly 34 mounted on the disk base and configured to move at least one head gimbal assembly 28 to position at least one slider 20 top access data 22 stored on the rotating disk surface. The data may be organized as tracks that may be configured as concentric circles or as a tightly packed spiral. An assembled circuit board 40 is also mounted on the disk base opposite the spindle motor and the voice coil motor. A disk cover 18 is mounted on the disk base to encapsulate all of the shown components except the assembled circuit board.

The disk storage device 10 preferably accesses the data 22 arranged in tracks on the rotating disk surface 6 by controlling the spindle motor 14 to rotate the disks 12 at a preferred rate. The voice coil motor 36 operates by stimulating the voice coil 32 with a time varying electrical signal to magnetically interact with the fixed magnet assembly 34 causing the head stack assembly 38 to pivot about the actuator pivot 30 moving the head gimbal assembly 28 to position the slider 20 near the track on the rotating disk surface. In many embodiments, a micro-actuator assembly preferably coupled to the slider may be further stimulated to further control the position of the slider. A vertical micro-actuator either in the micro-actuator assembly, or preferably in the slider, may be stimulated to alter the flying height of the slider over the rotating disk surface.

Figure 2:
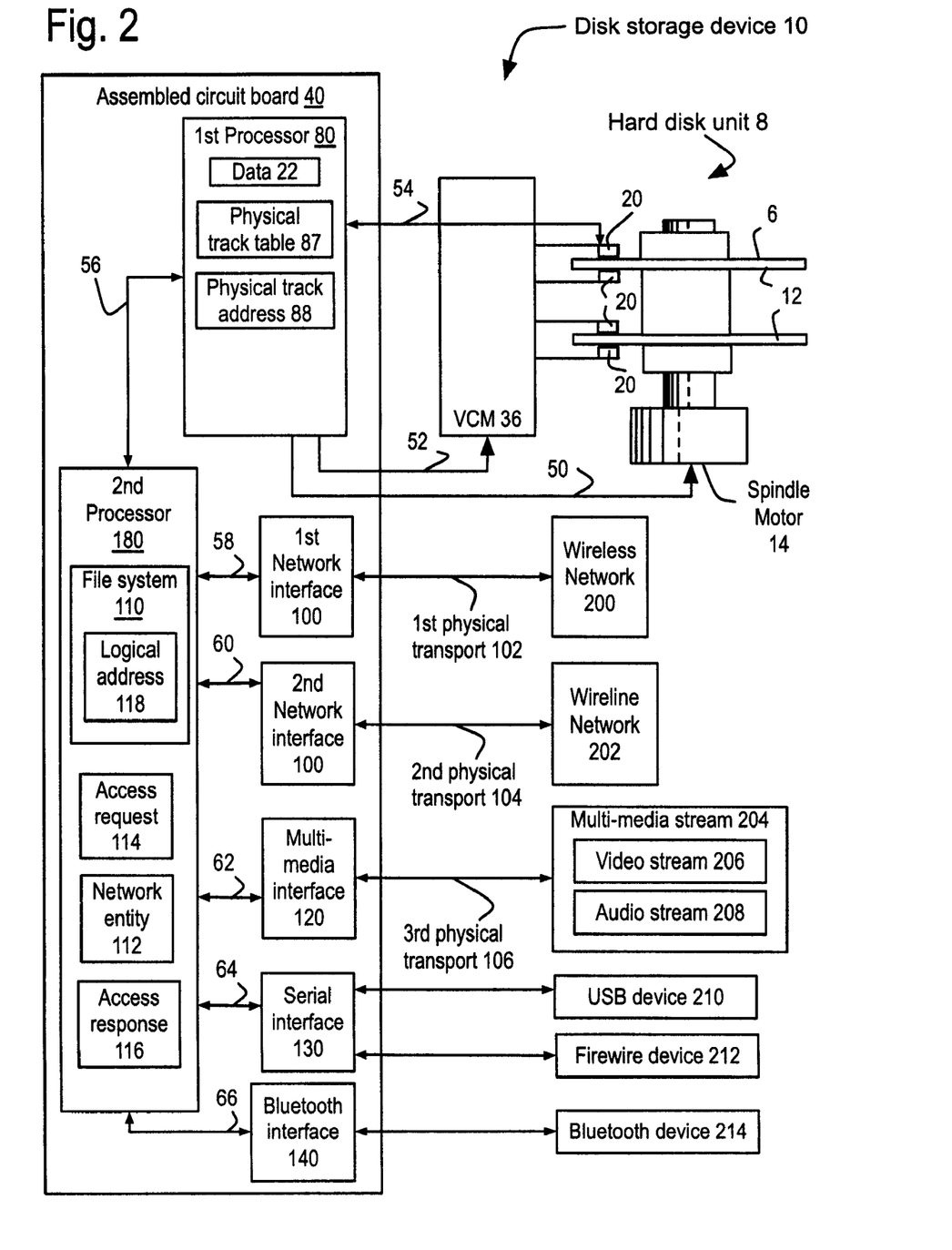

FIG. 2 shows a schematic of the disk storage device 10 of FIG. 1. The assembled circuit board 40 includes a first processor 80 controllably coupled 52 to the voice coil motor 36 and controllably coupled 50 to the spindle motor 14 and communicatively coupled 54 to a slider 20 that may be positioned over the rotating disk surface 6. The assembled circuit board may also include a second processor 180 communicatively coupled 56 with the first processor. The second processor may be communicatively coupled 58 to at least one network interface 100, and as shown, to two network interfaces, one of which supports a first physical transport 102 to a wireless network 200 and the other supporting a second physical transport 104 to a wireline network 202. The second network interface may have a distinct communicative coupling 60 with second processor. The second processor may operate a file system 110 to organize the access of the data 22 on the rotating disk surface. It may also operate a network entity 112 for processing at least one access request 114 received from one of the network interfaces to use the file system for the access of the data to create at least one access response 116. The network entity may include a network address, possibly with access procedures to insure privacy and/or parental controls.

Receipt of the access request 114 may trigger the first processor 80 to use the physical track table 87 to convert a logical address 118 referenced by the file system 110 to create the physical track address 88 used to access the data 22 in the hard disk unit 8, more particularly, on the rotating disk surface 6.

The access request 114 may include one or more of the following requests: A request to download at least one file into the file system of the disk storage device 10 from somewhere else in the network or from the internet. A request to play a file in the file system 110 for presentation either across a network 200 or 202. A request to play a file in the file system for presentation through 64 a multi-media interface 120, creating at least one multi-media stream 204. A request to upload a file from the disk storage device via 64 a serial interface 130 to a USB device 210 and/or a firewire device 212. A request to upload the file via 66 a Bluetooth interface 140 to a Bluetooth device 214. And a request to upload a file from the disk storage device through a network interface 100. The communicative couplings 62, 64 and/or 66 may or may not involve a wired and/or a wireless communicative coupling to the interfaces 120, 130 and/or 140.

Further preferred embodiments of the disk storage device 10 may have the assembled circuit board 40 include more than one network interface 100, preferably at least one dedicated to wireline communications and at least one to wireless communications, facilitating the needs of many home and business environments for flexible interface capabilities.

By way of example, the first physical transport 102 may include at least one of a wireless physical transport, including an infrared physical transport and a radio frequency physical transport, which collectively cover the electromagnetic spectrum from just below the frequency humans tend to see as red to about 60 Hertz. The radio frequency spectrum may be preferred as a support of a wireless network 200, but infrared physical transports may also be implemented. Typical implementations of the first physical transport may be used to implement a version of the Institute for Electrical and Electronic Engineers (IEEE) 802.11 standard, which today may be preferred as version a, b, g, and/or n. Alternative implementations may include a version of the IEEE 802.15 standard.

By way of example, the second physical transport 104 may support a wireline physical transport including at least one of a fiber optic transport, a coaxial cable transport, and a twisted pair transport. The network interface 100, shown as the second network interface, may support a version of a wireline network protocol that may be compatible with a version of Ethernet used in a wireline network 202.

Further preferred embodiments of the disk storage device 10 may have the assembled circuit board 40 include at least one multi-media interface 120 for delivering at least one multi-media stream 204. As used herein, a multi-media stream delivers at least one video stream 206 and at least one audio stream 208. This added capability serves to provide multi-media streams directly from the disk storage device without the expense of additional devices and complexity of making them all work together. A third physical transport 106 may include variations of the first physical transport 102 and/or the second physical transport 104, with the second physical transport being currently preferred.

The assembled circuit board may also include a serial interface 130 to a Universal Serial Bus (USB) device 210 and/or to a firewire device 212. As used herein, a firewire device is compatible with a version of the IEEE 1394 standard.

As used herein, a controller receives at least one input and maintains/updates at least one state and generates at least one output based upon the value of at least one the inputs and/or at least one of the states. As used herein, a controller may be implemented using at least one instance of a finite state machine and/or at least one instance of a computer. The computer is accessibly coupled via a bus to a computer readable memory and instructed by a program system including program steps residing in the memory.

Figure 3:
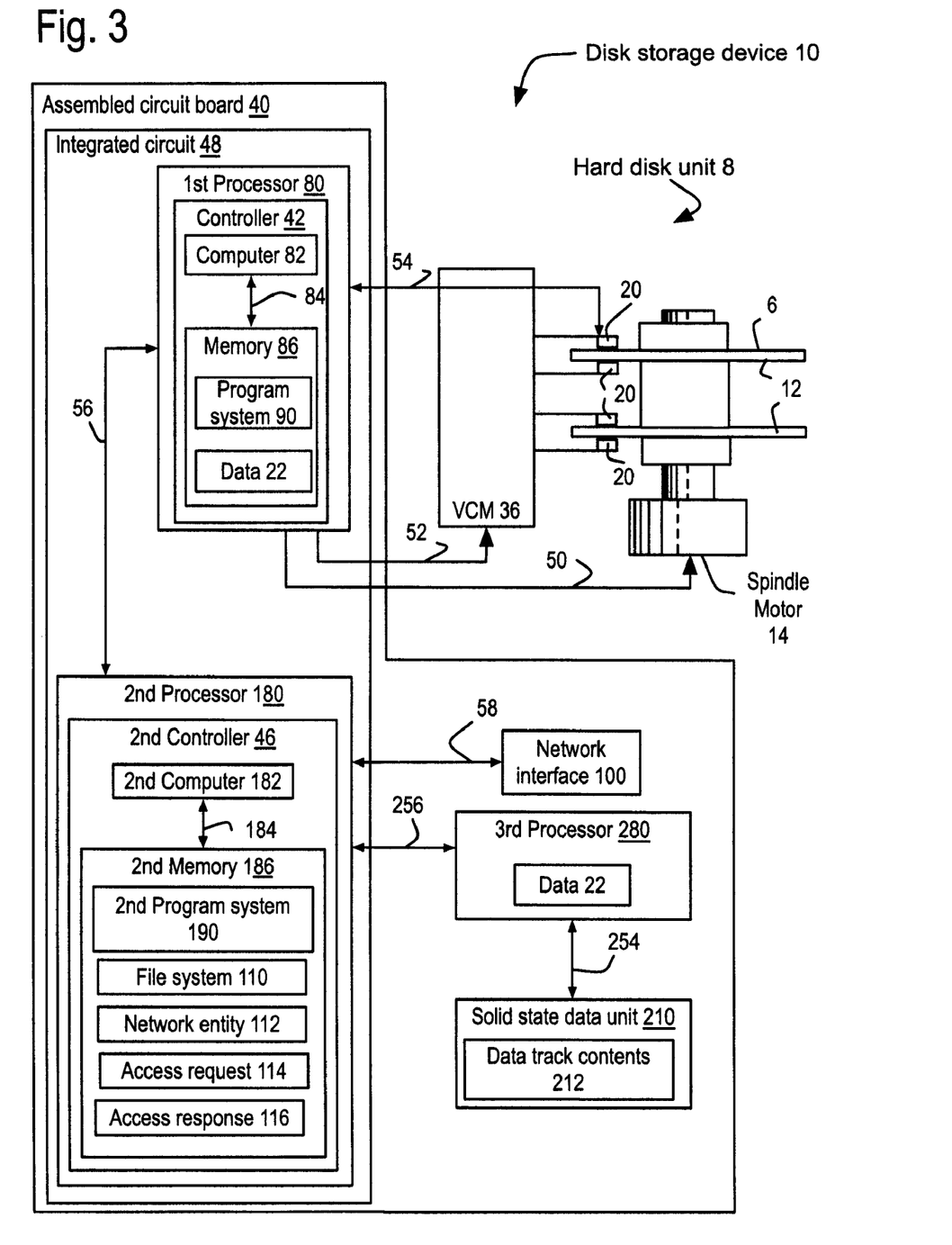
FIG. 3 shows some details of an example embodiment of the disk storage device, and in particular the assembled circuit board, where the first processor may include at least one controller that includes a computer accessibly coupled via a bus to a first memory including a first program system and temporary store for the data involved in the access of the hard disk unit. The second processor may include a second controller that may also include a second computer accessibly coupled to a second memory. The second memory may preferably include a second program system, the file system, the network entity, the access request and possibly a temporary store for part or all of the access response. The disk storage device and its assembled circuit board may further include a third processor configured to communicate with a solid state data unit to further access its data.

FIG. 3 shows some details of an example embodiment of the disk storage device 10, and in particular the assembled circuit board 40, where the first processor 80 may include at least one controller 42 that includes a first computer 80 accessibly coupled 84 via a bus to a computer readable memory 86 including a first program system 90 and temporary store for the data 22 involved in the access of the rotating disk surface 6. The second processor 180 may include a second instance 46 of a controller that may also include a second computer 182 second accessibly coupled 184 to a second computer readable memory 186. The second memory may include a second program system 92, possibly some or all of the following: the file system 110, the network entity 112, the access request 114 and a store for at least part of the access response 116. The disk storage device and its assembled circuit board may further include a third processor 280 configured to communicate with a solid state data unit 210 to further access its data. The second processor may be communicatively coupled 256 with the third processor in order to access the data stored in the solid state data unit in response to the access request.

The assembled circuit board 40 may include a single integrated circuit 48 containing both the first processor 80 and the second processor 82. The integrated circuit may include just one computer with a single memory including both the first program system 90 and the second program system 92, or alternatively include two computers as shown in FIG. 3. The integrated circuit may further include the file system 110 as shown and/or include the network interface 100, which has not been shown.

Figure 4:
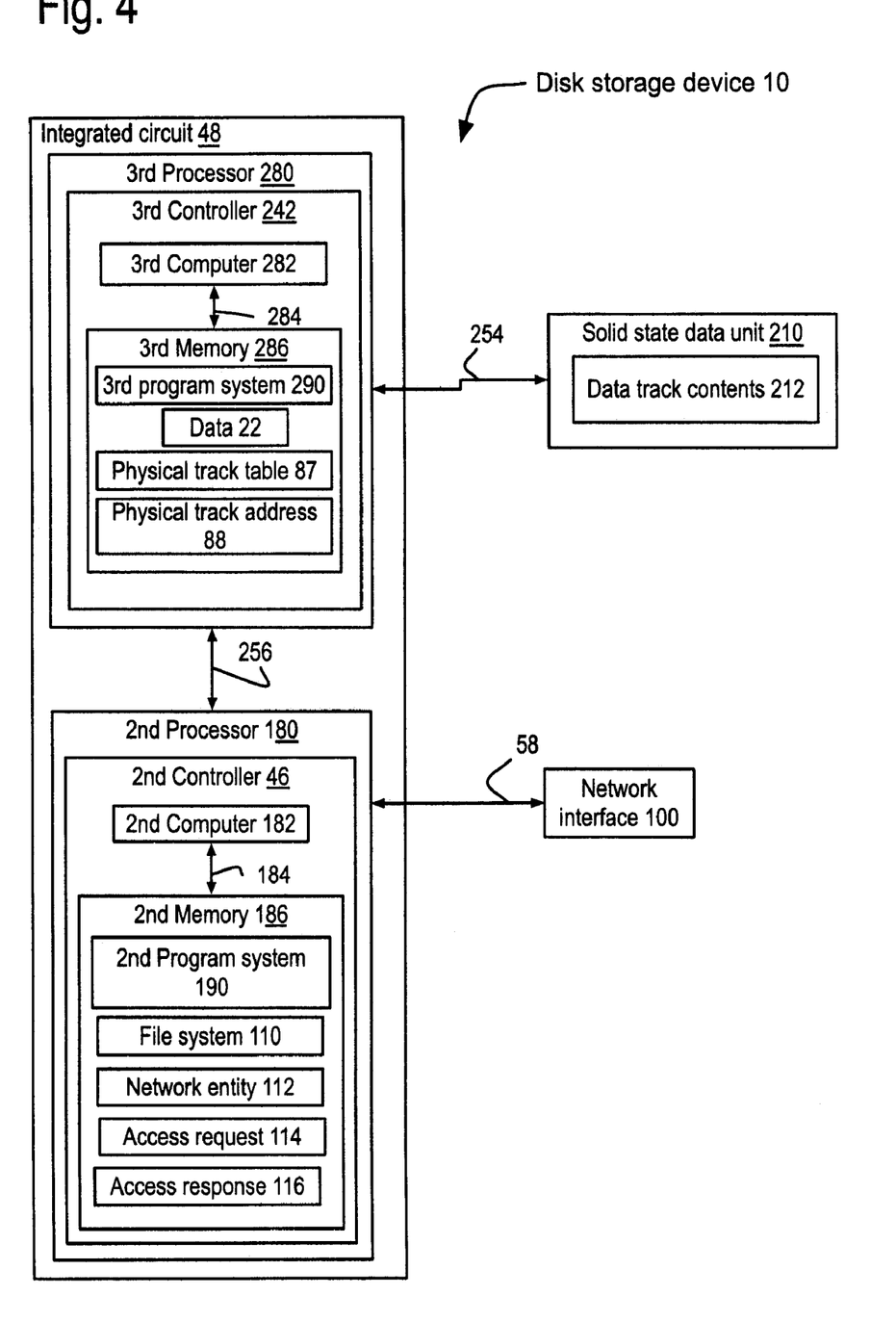
FIG. 4 shows a variation on FIG. 3 where the disk storage device does not include the first processor, the hard disk unit and also does not include the assembled circuit board, all of which may be preferred in some situations. The third processor also includes at least one instance of a controller, that may further include a third computer accessibly coupled via a bus with a third computer readable memory including a third program system and data to be used in access of the data track contents stored in the solid state data unit.

FIG. 4 shows a variation on FIG. 3 where the disk storage 10 device does not include the first processor 80, the hard disk unit 8 and also does not include the assembled circuit board 40, all of which may be preferred in some situations. The third processor 280 also includes at least one instance of a third controller 242, that may further include a third computer 282 accessibly coupled 284 via a bus with a third computer readable memory 286 including a third program system 290 and data 22 to be used in access of the data track contents 212 stored in the solid state data unit 210. The integrated circuit 48 may include the second processor 180 and the third processor.

Some of the following figures show flowcharts of at least one embodiment of the method, which may include arrows signifying a flow of control, and sometimes data, supporting various implementations of the invention's operations. These include a program operation, or program thread, executing upon a computer, and/or a state transition in a finite state machine. The operation of starting a flowchart refers entering a subroutine or a macro instruction sequence in the computer, and/or directing a state transition in the finite state machine, possibly while pushing a return state. The operation of termination in a flowchart refers completion of those operations, which may result in a subroutine return in the computer, and/or popping of a previously stored state in the finite state machine. The operation of terminating a flowchart is denoted by an oval with the word "Exit" in it.

Figure 5:
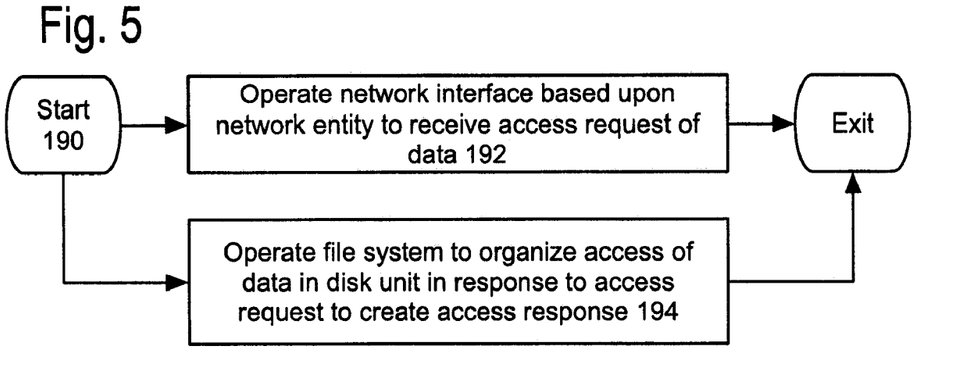
FIG. 5 shows some details of the second program system operating the network interface based upon the network entity to receive an access request of the data and operating the file system to organize access of the data in at least one of the disk units in response to the access request to create the access response.

FIG. 5 shows some details of the second program system 190 including the at least one of the following: Program step 192 operates the network interface 100 based upon the network entity 112 to receive an access request 114 of the data 22. And program step 194 operates the file system 110 to organize access of the data in at least one of the disk units 8 and/or 210 in response to the access request to create the access response 116.

Figure 6:
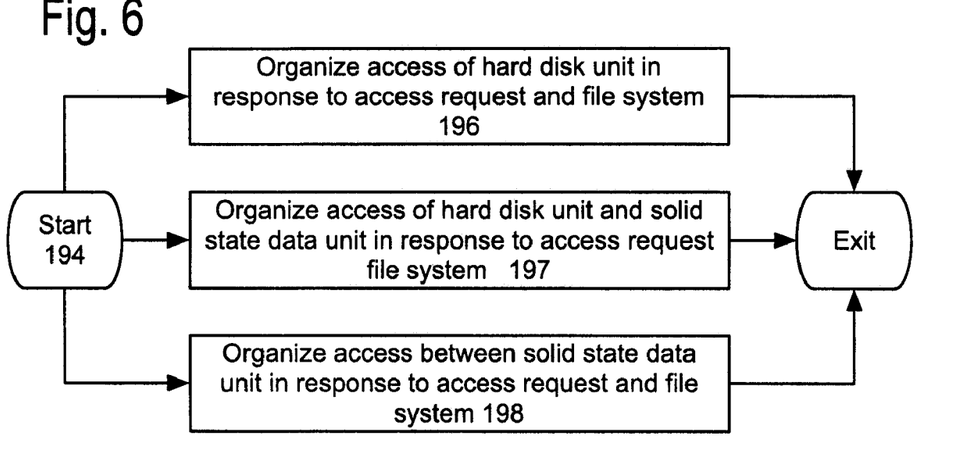
FIG. 6 shows some details of organizing the access in terms of the hard disk units and/or the solid state data units.

FIG. 6 shows some details of program step 194 organizing the access in terms of the hard disk units 10 and/or the solid state data units 210. Program step 196 organizes the hard disk unit in response to the access request 114 and the file system 110. Program step 197 organizes the hard disk unit and the solid state data unit. And program step 198 organizes the solid state data unit.

Figure 7:
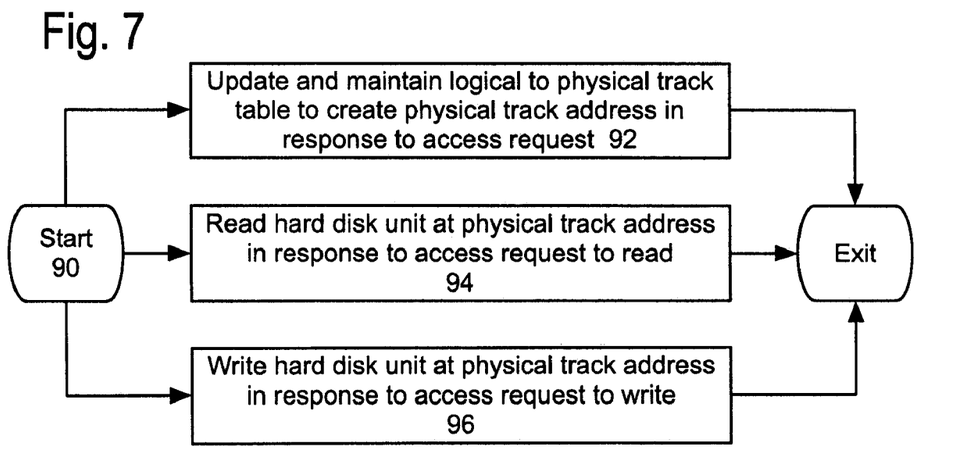
FIGS. 7 and 8 show some details of accessing data in the hard disk unit.
Figure 8:
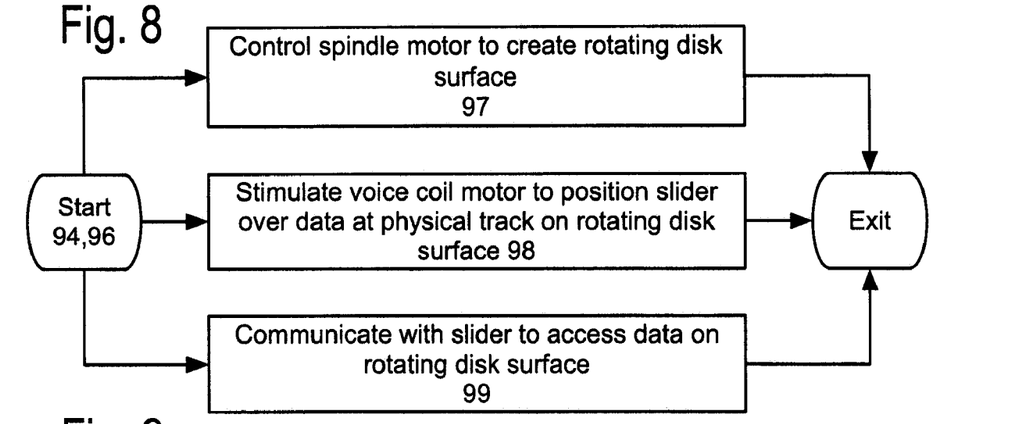

FIGS. 7 and 8 show some details of accessing data in the hard disk unit 8. FIG. 7 shows the program system 90 including at least one of the following: Program step 92 updates and maintains a logical to physical track table to create at least one physical track address in response to the access request 114. Program step 94 reads the hard disk unit at the physical track address in response to the access request to read. And program step 96 writes the hard disk unit at the physical track address in response to the access request to write. The physical track table of the hard disk unit is very similar to the physical track table of a solid state data unit 210. Both map a logical address 118 to a physical track address 88. As these components age, a specific physical track may be found faulty and the physical track table may be updated with a different physical track being selected, often based upon a Least Recently Used criteria, or something approximating this criteria. Note that FIG. 7 has been shown as an example not only of the hard disk unit's 8 operation but also the solid state data unit's 210 operation.

FIG. 8 shows some details relevant to the operations of reading 94 and writing 96 the hard disk unit 8. Program step 97 controls the spindle motor 14 to create the rotating disk surface 6. Program step 98 stimulates the voice coil motor 36 to position the slider 20 at the physical track address 88 on the rotating disk surface. And program step 99 communicates with the slide 20 to access data on the rotating disk surface.

The communication 54 of program step 99 between the first processor 80 and the slider 20 may include operation of separate read and write channels, where the read channel is frequently used during both read access and write access to sense a servo pattern on the rotating disk surface 6 that is used to generate a Position Error Signal providing feedback often used in the program step 98 to further control the positioning of the slider near the data. The first processor may further include a channel interface to the read channels and the write channels of each of the sliders within the hard disk unit 8.

Figure 9:
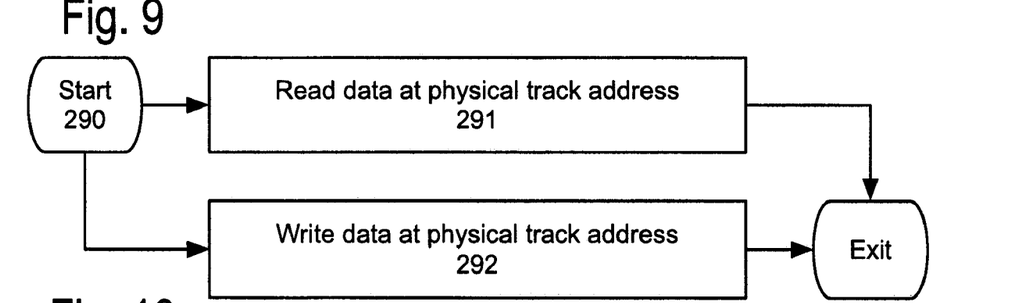
FIGS. 9 to 11 shows some details of accessing data in the solid state data unit.
Figure 10:
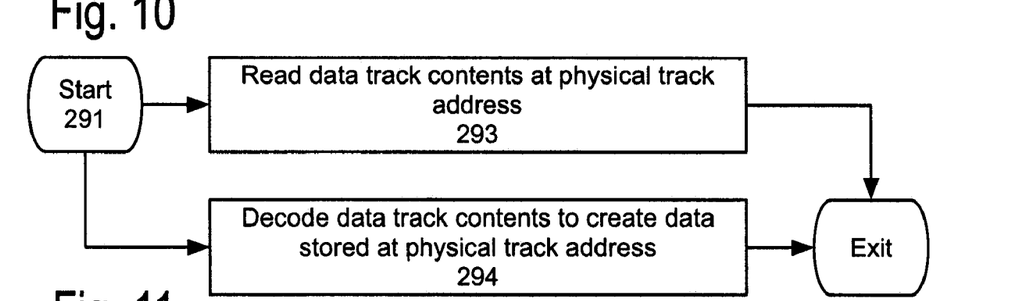
Figure 11:
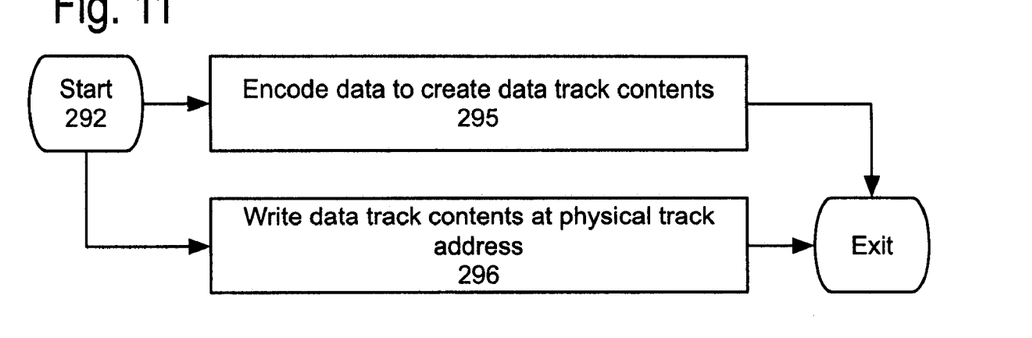

FIGS. 9 to 11 shows some details of accessing data in the solid state data unit 210. FIG. 9 shows the third program system 290 including the following: Program step 291 reads the data track contents 212 at the physical track address 88. Program step 292 writes the data track contents at the physical track address.

FIG. 10 show some details of program step 291 reading the data track contents in the solid state data unit 210. Program step 293 reads the data track contents 212 at the physical track address 88. And program step 294 decodes the data track contents to create the data 22 stored at the physical track address. The process of this flowchart is similarly applicable to the operation of reading data in the hard disk unit 8.

FIG. 11 shows some details of program step 292 writing the data track contents in the solid state data unit 210. Program step 295 encodes the data 22 to create the data track contents 212. And program step 296 writes the data track contents at the physical track address 88. Again, the process of this flowchart is similarly applicable to the operation of writing data in the hard disk unit 8.

The preceding embodiments provide examples of the invention, and are not meant to constrain the scope of the following claims.

What is claimed is:

1. A disk storage device, comprising:
    at least one disk unit configured to store data;
    a first processor communicatively coupled to said disk unit to access data in said disk unit; and
    a second processor communicatively coupled to said first processor and to at least one network interface to operate
    a file system for organizing said access of said data in said disk unit and
    a network entity for processing at least one request received from said network interface to use said file system for said access of said data to create at least one access response to said request
    said disk storage unit further comprises a first of said disk unit as a hard disk unit including
    a disk base;
    a spindle motor mounted on said disk base and rotatably coupled to at least one disk to create at least one rotating disk surface;
    a voice coil motor pivotably mounted to said disk base to position at least one slider over said rotating disk surface; and
    wherein said first processor communicatively coupled to said disk unit, further comprises said first processor controllably coupled said spindle motor and to said voice coil motor, and communicatively coupled with said slider to access data on said rotating disk surface; and
    wherein said second processor communicatively coupled to said first processor and to at least one network interface to further operate said file system for organizing said access to said data on said rotating disk surface.

2. The disk storage device of claim 1, wherein further comprises a second of said disk unit is as a solid state data unit.

3. The disk storage device of claim 1, wherein said network entity operates based upon a network address.

4. The disk storage device of claim 1, wherein said network interface supports communication with at least one physical transport layer belonging to a group consisting of a wireline physical transport and a wireless physical transport.

5. The disk storage device of claim 4, wherein said wireline physical transport includes at least one member of the list comprising a fiber optic transport, a coaxial cable transport, and a twisted pair transport.

6. The disk storage device of claim 5, wherein said network interface supports a version of a wireline network protocol compatible with a version of Ethernet.

7. The disk storage device of claim 4, wherein said wireless physical transport includes an infrared physical transport and a radio frequency physical transport.

8. The disk storage device of claim 7, wherein said network interface supports a version of a wireless network protocol compatible with an IEEE 802[period]11 standard.

9. The disk storage device of claim 7, wherein said network interface supports a version of a wireless network protocol compatible with an IEEE 802[period] 15 standard.

10. The disk storage device of claim 1, wherein said second processor includes at least one instance of a controller belonging to a group consisting of a finite state machine and a computer accessibly coupled to a computer readable memory and instructed by a program system including at least one program step residing in said memory.

11. The disk storage device of claim 10, wherein said program system includes the program step of:
    operating said file system for organizing said access to said data in said disk unit in response to said request to create said access response.

12. The disk storage device of claim 10, wherein said program system includes the program step of:
    operating said network entity for processing said at least one request received from said network interface to use said file system for said access of said data to create said at least one access response to said request.

13. The disk storage device of claim 1, further comprising:
    at least one multi-media interface configured for sending at least one of said access responses including at least one motion graphics stream and at least one audio stream.

14. The disk storage device of claim 1, further comprising:
    at least one serial interface compatible with a version of at least one member of a serial protocol standards group including Universal Serial Bus and IEEE 1394.

15. The disk storage device of claim 1, further comprising an integrated circuit including said first processor and said second processor.

16. A method, comprising the steps of:
    operating said disk storage device of claim 1, further comprising the steps of:
    operating said network interface based upon said network entity to receive said access request of said data; and
    operating said file system to organize said access of said data in said disk unit in response to said access request to create said access response.

17. An assembled circuit board for said disk storage device of claim 1, including:
    said first processor configured for communicatively coupling with at least one of said disk unit to access said data included in said disk unit;
    said second processor communicatively coupled to said first processor and to at least one of said network interface to operate
    said file system for organizing said access to said data in said disk unit and
    said network entity for processing at least one of said request received from said network interface to use said file system for said access of said data to create at least one of said access response to said request.

18. An integrated circuit for said disk storage device of claim 1, including
    said first processor configured for communicatively coupling with at least one of said disk unit to access said data included in said disk unit; and
    said second processor communicatively coupled to said first processor and configured to communicatively couple with at least one of said network interface to operate
    said file system for organizing said access to said data in said disk unit and
    said network entity for processing at least one of said request received from said network interface to use said file system for said access of said data to create at least one of said access response to said request.

* * * * *